United States Patent [19]
Urban

[11] 3,768,498
[45] Oct. 30, 1973

[54] FUEL TANK VENTILATING SYSTEM
[75] Inventor: Norbert Urban, Bienrode, Germany
[73] Assignee: Volkswagonwerk Aktiengesellschaft, Wolfsburg, West Germany
[22] Filed: Sept. 2, 1971
[21] Appl. No.: 177,303

[30] Foreign Application Priority Data
Sept. 15, 1970 Germany.................. P 20 45 458.4

[52] U.S. Cl.................... 137/43, 137/173, 137/202, 220/44 R
[51] Int. Cl............................................ F16k 45/00
[58] Field of Search........................ 137/41, 43, 173, 137/202

[56] References Cited
UNITED STATES PATENTS
| | | | |
|---|---|---|---|
| 3,548,847 | 12/1970 | Roven | 137/43 |
| 3,614,960 | 10/1971 | Perengle | 137/43 |
| 2,194,348 | 3/1940 | Zoder | 137/43 |
| 1,873,403 | 8/1932 | Higgins | 137/202 |
| 3,643,690 | 2/1972 | Sarai | 220/44 R X |

FOREIGN PATENTS OR APPLICATIONS
544,427   9/1922   France.................................. 137/43

Primary Examiner—Alan Cohan
Assistant Examiner—Gerald A. Michalsky
Attorney—Granville M. Brumbaugh et al.

[57] ABSTRACT

A system for ventilating a fuel tank. The apparatus includes a number of ventilating lines connected at different points to the upper surface of the fuel tank and a ventilating valve, arranged in at least one of the lines, for inhibiting the passage of fuel through the line and permitting the passage of gases. The ventilating lines are preferably connected together and to a main ventilating line which terminates in a filter. The ventilating valve or valves prevent fuel from reaching and contaminating the filter.

3 Claims, 3 Drawing Figures

PATENTED OCT 30 1973 3,768,498

FUEL TANK VENTILATING SYSTEM

BACKGROUND OF THE INVENTION

The present invention relates to a system for ventilating a fuel tank and, more particularly, to ventilating apparatus comprising a number of ventilating lines connected at different points to the upper surface of a fuel tank.

To maintain clean air, the fumes and gases which originate in a fuel tank can no longer be allowed to reach the atmosphere unfiltered. Specifically, it is necessary to provide a filter in the fuel tank ventilating system and to provide means for preventing fuel from reaching and contaminating the filter notwithstanding the fact that the motor vehicle, in which the tank is installed, may undergo sharp accelerations and decelerations, may be parked or driven at a steep incline, or even overturned.

Instead of providing a filter, it is possible to terminate the lines of a fuel tank ventilating system directly in the vehicle carburetor. However, even in this case it is preferable to inhibit the passage of fuel through the system lines to prevent excess fuel from reaching the carburetor.

The German Pat. No. 1,175,097 discloses a fuel tank provided with two ventilating lines that open into the interior of the tank near its opposite ends. Although, in many cases, this arrangement does not prevent the overflow of fuel, it fails to provide a reliable safeguard when the vehicle is overturned or positioned on an extremely sharp incline. In addition, the ventilation properties are deficient when this arrangement is used with the relatively flat, large-surface fuel tanks that are now in common use on motor vehicles.

SUMMARY OF THE INVENTION

An object of the present invention is to provide a system for ventilating a fuel tank which reliably inhibits an outflow of fuel from the tank through the ventilating lines and, thus, prevents contamination of the system filter no matter what the position of the motor vehicle may be.

This object, as well as other objects which will become apparent in the discussion that follows, is achieved, according to the present invention, by arranging, in at least one of the interconnected ventilating lines, a ventilating valve which blocks the passage of fuel and permits the passage of gases.

Particularly with a "pancake-type" gas tank having a large, relatively flat upper surface, it is desirable to provide several—preferably four—interconnected ventilating lines and to lead these lines diagonally together to a main ventilating line. Passage of fuel from the fuel tank to the main ventilating line is prevented, in this case, by arranging a ventilating valve in each of the lines connected to the tank.

In its preferred embodiment, the ventilating valve which is used in the system just described is provided with a float and a movable weight arranged between the float and the base of the valve. The movable weight is made sufficiently heavy so that it will overcome the tendency of the float to rise in surrounding fuel if the valve is turned upside down.

The bottom portion or base of the float as well as the base of the valve are preferably constructed with concave, cone-shaped surfaces. The cone-shaped internal surface of the valve base extends into an opening permitting the entrance of gases and fuel from the fuel tank. In addition, this cone-shaped surface is provided with longitudinal grooves which permit the passage of gases.

The movable weight mentioned above is situated between the cone-shaped base of the float and the cone-shaped surface of the valve base. This weight is constructed with matching convex cone-shaped surfaces and has an axial opening extending approximately throught its center.

The float is provided with a cylindrical projection at its upper end. This projection extends upwardly and mates with a valve exit opening at the top of the valve. Surrounding this projection is a circular gasket, having a U-shaped cross-section, which presses against a suitable matching surface in the valve to close the exit opening when the float is lifted upwards by the presence of fuel.

DESCRIPTION OF THE PREFERRED EMBODIMENT

The preferred embodiment of the fuel tank ventilating system according to the present invention will now be described in connection with FIGS. 1–3 of the drawings.

Figure 1:
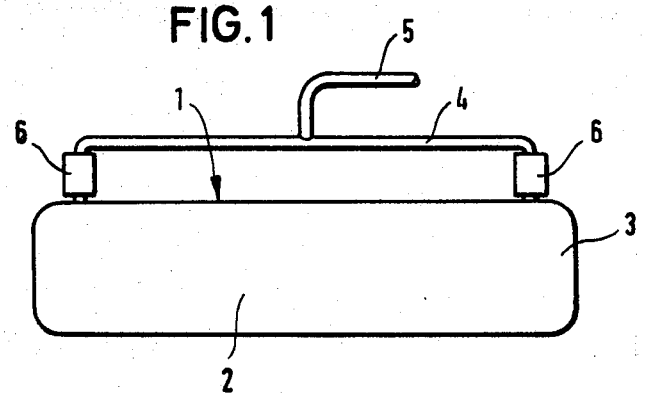
FIG. 1 is a side view of a fuel tank and a fuel tank ventilating system constructed according to the preferred embodiment of the present invention.
Figure 2:
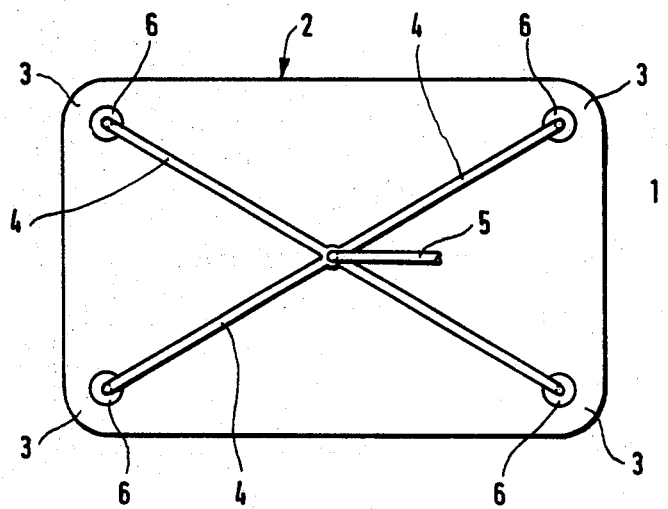
FIG. 2 is a top view of the tank and the ventilating system of FIG. 1.
Figure 3:
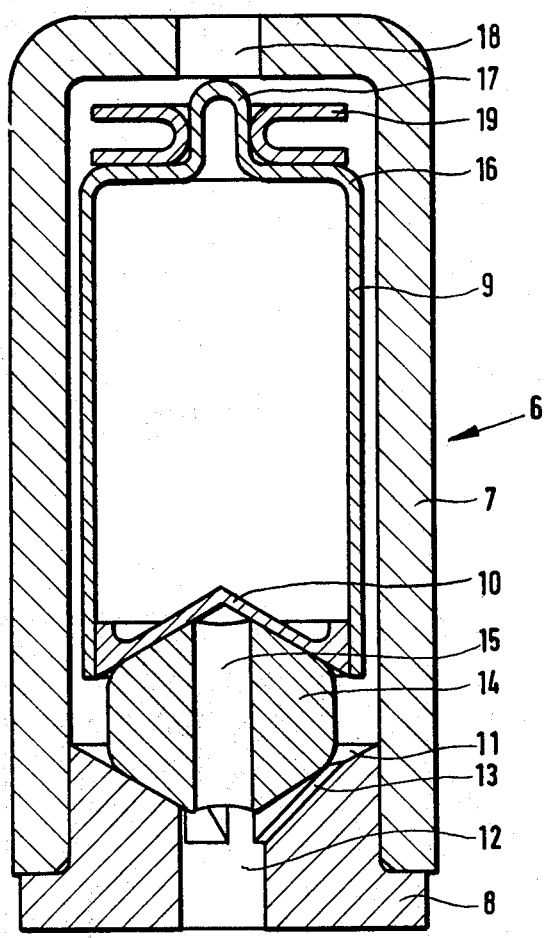
FIG. 3 is a cross-sectional view of the ventilating valve employed in the ventilating system of FIG. 1.

As shown in FIGS. 1 and 2, the upper surface 1 of a fuel tank 2 is provided at each corner 3 with a ventilating line 4. The four ventilating lines 4 extend diagonally toward the center of the fuel tank 2 where they connect with each other and with a common, main ventilating line 5.

A ventilating valve 6 is built into each ventilating line 4 at a point immediately above the connection with the fuel tank 2. As shown in FIG. 3, the ventilating valve 6 consists of a valve body 7 which is closed by a valve base 8. Within the ventilating valve 6 is arranged a float 9 which is free to move in the enclosed space. The float 9 has a concave cone-shaped base portion 10. The valve base 8 is likewise constructed with a concave, cone-shaped internal surface 11 which extends into an opening 12 that serves as the valve inlet. Grooves 13 are provided in the cone-shaped surface 11 for the passage of gases.

Between the float 9 and the valve base 8 is arranged a member 14 which is formed with surfaces that approximately correspond to the cone-shaped surfaces of the float base 10 and the valve base 8. The member 14 has, at its center, an axially extending opening 15.

The upper end 16 of the float 9 is provided with an upwardly extending cylindrical projection 17. This projection mates with an outlet opening 18 in the valve body 7 and serves as a centering guide for the float 9. A circular gasket 19 with a U-shaped cross-section surrounds the projection 7 and presses against the upper inside surface of the valve body effecting closure of the opening 18 when the float is in its upper position.

The ventilating apparatus according to the present invention functions to provide at all times at least one open (fuel free) ventilating path from the fuel tank 1 to the main ventilating line 5 no matter what the position or incline of the motor vehicle in which the tank is installed may be. Since the inlets of the four ventilating valves 6 are connected to the four corners of the fuel tank 1, one of the ventilating valves will always be free of fuel.

Should fuel in the tank 1 be splashed or forced by gravity into a ventilating valve 6, it will enter the opening 12 in the valve base 8 and pass through the opening 15 of the movable member 14 to the interior of the valve. The presence of fuel in the valve interior will raise the float 9 causing the cylindrical projection 17 to slide into the outlet opening 18 and the gasket 19 to press against the valve body 7, closing the outlet opening 18. Fuel which has entered the valve interior drains out of the valve both through the opening 15 in the member 14 and through the grooves 13 in the valve base 8.

Due to the particular configuration of the float base 10, the float will also quickly close the opening 18 when subjected only to light fuel spray as may occur, for example, if the vehicle is accelereated or decelerated sharply or is driven around a curve. The ventilating valves 6 which have not received fuel permit gases from the tank 1 to pass unimpeded through the grooves 13 in the valve base 8 and through the outlet opening 18 in the valve body 7 to the ventilating lines 4.

Should the motor vehicle accidently overturn so that fuel is applied simultaneously to all the ventilating valves 6, the movable members 14, which are heavier than the force tending to lift the floats 9 in the presence of fuel, will maintain all the floats in the closed position.

As may be seen, the apparatus according to the present invention is an absolutely reliable system for ventilating a fuel tank. No matter what the position of the motor vehicle may be, fuel is prevented from entering the main ventilating line and, thus, from reaching and contaminating the ventilating filter.

It will be understood that the above description of the present invention is susceptible to various modifications, changes and adaptations as will occur to those skilled in the art. It is therefore intended that the scope of the present invention be limited only by the following claims or their equivalents.

I claim:
1. A valve for use in ventilating a fuel tank comprising, in combination:
   a. a hollow valve body;
   b. a valve base forming the bottom of said valve body when the valve is in the upright position, said valve base having an inlet opening;
   c. a float, arranged in said valve body, for closing the passage through the valve when it is urged toward the top of the valve; and
   d. a movable member arranged between said float and said valve base for applying a downward force due to gravity to said float when the valve is upside down, said force due to gravity being greater than the upward force due to the buoyancy of said float, said movable member having a passageway therethrough connecting said inlet opening with the lower external surface of said float;
   whereby, when the valve is upright, incoming gases are permitted to pass therethrough while incoming fuel is directed against the lower extenral surface of said float and enters said valve body to raise said float and close the valve; and whereby, when the valve is upside down, said movable member causes said float to close the valve.

2. A valve for use in ventilating a fuel tank comprising, in combination:
   a. a hollow valve body;
   b. a valve base forming the bottom of said valve body when the valve is in the upright position, said valve base having an inlet opening;
   c. a float, arranged in said valve body, for closing the passage through the valve when it is urged toward the top of the valve, the lower external surface of said float being concave and approximately cone-shaped in the region opposite said inlet opening; and
   d. a movable member arranged between said float and said valve base for applying a downward force due to gravity to said float when the valve is upside down, said force due to gravity being greater than the upward force due to the bouyancy of said float, said movable member having a passageway therethrough connecting said inlet opening with said concave, cone-shaped surface of said float;
   whereby, when the valve is upright, incoming gases are permitted to pass therethrough while incoming fuel is directed against said concave, cone-shaped surface of said float and enters said valve body to raise said float and close the valve; and whereby, when the valve is upside down, said movable member causes said float to close the valve.

3. The valve defined in claim 2, wherein:
   the upper interior surface of said valve base is concave and approximately cone-hsaped, extending outward from said inlet opening passing through said valve base, said cone-shaped interior surface having at least one groove therein extending outward from said inlet opening for the passage of gas into the interior of said valve means; and
   said movable member has upper and lower surfaces which are convex and approximately match the concave, cone-shaped surfaces of said float and said valve base.

* * * * *